(12) United States Patent
Nakayama (10) Patent No.: US 9,519,446 B2
(45) Date of Patent: Dec. 13, 2016

(54) PRINTING SYSTEM, IMAGE FORMING APPARATUS AND PROXY RESPONSE METHOD

(71) Applicant: Konica Minolta, Inc., Tokyo (JP)

(72) Inventor: Yoshimi Nakayama, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/105,774

(22) Filed: Dec. 13, 2013

(65) Prior Publication Data

US 2014/0176984 A1 Jun. 26, 2014

(30) Foreign Application Priority Data

Dec. 20, 2012 (JP) ................................ 2012-277614

(51) Int. Cl.
*G06F 3/12* (2006.01)
*H04N 1/00* (2006.01)
*G06K 15/00* (2006.01)

(52) U.S. Cl.
CPC ............. *G06F 3/121* (2013.01); *G06F 3/1236* (2013.01); *G06F 3/1261* (2013.01);
(Continued)

(58) Field of Classification Search
CPC ...... G06F 1/3203; G06F 3/126; G06F 1/3284; G06F 3/121
(Continued)

(56) References Cited

U.S. PATENT DOCUMENTS

| 2003/0053082 A1* | 3/2003 | Tomito | G06F 3/1204 358/1.2 |
| 2003/0174359 A1* | 9/2003 | Gomi | G06F 3/1261 358/1.15 |

(Continued)

FOREIGN PATENT DOCUMENTS

| JP | 2006-139378 A | 6/2006 |
| JP | 2006345102 A | 12/2006 |

(Continued)

OTHER PUBLICATIONS

Notification of Reasons for Refusal issued in corresponding Japanese Application No. 2012-277614 mailed Dec. 16, 2014 (6 pages).

*Primary Examiner* — Jacky X Zheng
(74) *Attorney, Agent, or Firm* — Osha Liang LLP (57) ABSTRACT

A printing system includes plural image forming apparatuses and a host apparatus. Each image forming apparatus is configured to work in one of a waiting state and a power saving state. An image forming apparatus as a sub-unit includes a control section configured to, on changing from the waiting state to the power saving state, request another image forming apparatus connected to the wired network to make a proxy response to the host apparatus for the sub-unit. An image forming apparatus as a base unit includes a control section configured to, in response to receiving a request to make the proxy response, receive a packet sent from the host apparatus to the sub-unit through the wireless network, and on determining that a communication error has occurred, instruct another image forming apparatus connected to the wired network to receive a packet sent from the host apparatus.

11 Claims, 9 Drawing Sheets

(52) U.S. Cl.
CPC ....... *G06F 3/1292* (2013.01); *G06K 15/4045* (2013.01); *H04N 1/0001* (2013.01); *H04N 1/00278* (2013.01); *H04N 1/00347* (2013.01); *H04N 1/00891* (2013.01); *H04N 1/00896* (2013.01); *G06K 15/402* (2013.01); *Y02B 60/1271* (2013.01); *Y02B 60/50* (2013.01)

(58) Field of Classification Search
USPC .............................................. 358/1.14, 1.15
See application file for complete search history.

(56) References Cited

U.S. PATENT DOCUMENTS

| | | | |
|---|---|---|---|
| 2005/0141014 A1* | 6/2005 | Kikuchi et al. | 358/1.14 |
| 2006/0274368 A1* | 12/2006 | Imine | 358/1.15 |
| 2010/0027063 A1* | 2/2010 | Jingu | 358/1.15 |
| 2010/0161819 A1 | 6/2010 | Ohara | |
| 2011/0261405 A1* | 10/2011 | Ito et al. | 358/1.15 |

FOREIGN PATENT DOCUMENTS

| | | |
|---|---|---|
| JP | 2010-146340 A | 7/2010 |
| JP | 2010-176424 A | 8/2010 |

\* cited by examiner

| ADDRESS INFORMATION OF MFP2 | |
|---|---|
| IP ADDRESS FOR WIRED NETOWRK | 192.168.1.10 |
| IP ADDRESS FOR WIRELESS NETOWRK | 192.168.1.42 |

FIG. 7

| APPARATUS INFORMATION OF MFP2 | |
|---|---|
| REMAINING QUANTITY OF Y TONNER | 80% |
| REMAINING QUANTITY OF M TONNER | 50% |
| REMAINING QUANTITY OF C TONNER | 50% |
| REMAINING QUANTITY OF K TONNER | 30% |
| TRAY 1 | A4 |
| TRAY 2 | A3 |
| ... | ... |

FIG. 9

| ADDRESS INFORMATION OF MFP2 | IP ADDRESS FOR WIRED NETWORK | IP ADDRESS FOR WIRELESS NETWORK |
|---|---|---|
| MFP2 | 192.168.1.10 | 192.168.1.42 |
| MFP5 | 192.168.1.21 | 192.168.1.53 |
| MFP7 | 192.168.1.18 | 192.168.1.50 |
|  |  |  |

PRINTING SYSTEM, IMAGE FORMING APPARATUS AND PROXY RESPONSE METHOD

This application is based on Japanese Patent Application No. 2012-277614 filed on Dec. 20, 2012, in the Japan Patent Office, the entire content of which is hereby incorporated by reference.

TECHNICAL FIELD

The present invention relates to a printing system, image forming apparatus, and a proxy response method. Particularly, the present invention relates to a printing system including a host apparatus which can give instructions through a wireless network to an image forming apparatus, to an image forming apparatus which can make a proxy response in reply to the instructions, and to the proxy response method performed in the printing system.

BACKGROUND

In order to shorten a waiting time until a printed material is outputted, image forming apparatuses such as a printer and an MFP (Multi Function Peripheral) execute controls so as to keep the temperature of a fixing unit thereof for fixing a toner image formed on a paper sheet to be constant, which results in large power consumption of the image forming apparatuses in a waiting state (normal mode). In view of that, an attempt to decrease the power consumption is practiced in the image forming apparatus by, when a nonuse state continues for a certain period, controlling the image forming apparatus to transition from a waiting state to a power saving state (power saving mode) in which less power is consumed than that in the waiting state.

On the other hand, in recent years, according to the prevalence of tablet terminals and smart-phones, not only a wired-network support but also a wireless-network support is requested to image forming apparatuses. To meet the request, image forming apparatuses are necessary to keep the waiting state such that a print request can be always accepted via a network. Even in a case where an image forming apparatus is going to transit into the power saving mode to stop power supply for certain functions, the image forming apparatus is not allowed to stop its network function to meet the request. Therefore, image forming apparatuses connectable to two lines of wired and wireless networks hardly provide sufficiently-decreased power consumption.

In view of these backgrounds, a proxy response method for use in a system including plural image forming apparatuses and a server has been proposed. In the method, the server or one of the image forming apparatus in a same network is assigned to be a base unit, and the other image forming apparatuses are operated in the power saving mode to accept only an activation request via a wired network, thus the power consumption of the total system is decreased, as disclose in Japanese Unexamined Patent Publication (JP-A) No. 2006-345102.

In this proxy response method, an image forming apparatus in which its wireless network function is working (an uprising base unit in the waiting state) receives a packet sent from a host apparatus (computer apparatus) toward another image forming apparatus (sub-unit) in the power saving state to make a proxy response. In case that the packet is a print request, the image forming apparatus as the uprising base unit sends an activation request via the wired network to the sub-unit, and the sub-unit executes printing after recovering from the power saving state. Thus, in the proxy response, since the image forming apparatuses other than the one base unit in the same network can keep the power saving state, the power consumption of the total system can be decreased.

Here, in a system where a host apparatus being a mobile terminal such as a tablet terminal and a smart-phone conducts wireless communications directly with image forming apparatuses without involving any repeater, conditions of the wireless communications are changeable according to the positional relationship between an image forming apparatus to be the base unit and the host apparatus. Therefore, in cases where the image forming apparatus to be the base unit and the host apparatus are positioned apart, or an obstruction exists between them, a communication error may occur on wireless communications between the image forming apparatus to be the base unit and the host apparatus, and the image forming apparatus to be the base unit can hardly execute instructions from the host apparatus properly.

SUMMARY

There are disclosed illustrative examples of printing systems, image forming apparatuses and proxy response methods.

An illustrative printing system reflecting one aspect of the present invention is a printing system comprising: a plurality of image forming apparatuses being communicable to each other through at least a wired network, and a host apparatus being communicable to the plurality of the image forming apparatuses through at least a wireless network. Each of the plurality of image forming apparatuses comprises: a print processing section configured to perform print processing and an interface section connected to the wireless network. Each of the plurality of image forming apparatuses is configured to work in one of a waiting state in which the print processing section can perform the print processing and a power saving state in which electric power is not supplied at least to the interface section. The plurality of image forming apparatuses include an image forming apparatus as a sub-unit and an image forming apparatus as a base unit. The image forming apparatus as the sub-unit further comprises a control section configured to, on changing from the waiting state to the power saving state, request another of the image forming apparatuses connected to the wired network to make a proxy response to the host apparatus for the image forming apparatus as the sub-unit. The image forming apparatus as a base unit further comprises a control section configured to, in response to receiving a request to make the proxy response from the image forming apparatus as the sub-unit, receive a packet sent through the wireless network from the host apparatus to the image forming apparatus as the sub-unit having requested the proxy response, determine whether a communication error has occurred on receiving the packet, and on determining that the communication error has occurred on receiving the packet, instruct another of the image forming apparatuses connected to the wired network to receive a packet sent from the host apparatus.

An illustrative image forming apparatus reflecting one aspect of the present invention is an image forming apparatus which can work as a base unit in a printing system. The printing system comprises: a plurality of image forming apparatuses being communicable to each other through at least a wired network and a host apparatus being communicable to the plurality of the image forming apparatuses through at least a wireless network. Each of the plurality of image forming apparatuses is configured to work in one of a waiting state in which print processing can be performed, and a power saving state in which electric power is not supplied at least to an interface section thereof connected to the wireless network. The plurality of image forming apparatuses include an image forming apparatus as a sub-unit and an image forming apparatus as a base unit. The image forming apparatus as the sub-unit includes a control section is configured to, on changing from the waiting state to the power saving state, request another of the image forming apparatuses connected to the wired network to make a proxy response to the host apparatus for the image forming apparatus as the sub-unit. The image forming apparatus as the base unit comprises: a print processing section configured to perform print processing in the waiting state; an interface section connected to the wireless network, where electric power is not supplied at least to the interface section in the power saving state; and a control section configured to, in response to receiving a request to make the proxy response from the image forming apparatus as the sub-unit having requested the proxy response, receive a packet sent through the wireless network from the host apparatus to the image forming apparatus as the sub-unit, determine whether a communication error has occurred on receiving the packet, and on determining that the communication error has occurred on receiving the packet, instruct another of the image forming apparatuses connected to the wired network to receive a packet sent from the host apparatus.

An illustrative proxy response method reflecting one aspect of the present invention is a proxy response method for use in a printing system. The printing system comprises: a plurality of image forming apparatuses being communicable to each other through at least a wired network, and a host apparatus being communicable to the plurality of the image forming apparatuses through at least a wireless network. Each of the image forming apparatuses is configured to work in one of a waiting state in which print processing can be performed, and a power saving state in which electric power is not supplied at least to an interface section thereof connected to the wireless network. The plurality of image forming apparatuses include an image forming apparatus as a sub-unit and an image forming apparatus as a base unit. The image forming apparatus as the sub-unit includes a control section configured to, on changing from the waiting state to the power saving state, request another of the image forming apparatuses connected to the wired network to make a proxy response to the host apparatus for the image forming apparatus as the sub-unit. The image forming apparatus as the base unit includes a control section configured to, in response to receiving a request to make the proxy response, perform the proxy response. The proxy response method comprises: operating the image forming apparatus as the base unit to, in response to receiving a request to make the proxy response from the image forming apparatus as the sub-unit, receive a packet sent through the wireless network from the host apparatus to the image forming apparatus as the sub-unit having requested the proxy response, operating the image forming apparatus as the base unit to determine whether a communication error has occurred on receiving the packet, and operating the image forming apparatus as the base unit to, on determining that the communication error has occurred on receiving the packet, instruct another of the image forming apparatuses connected to the wired network to receive a packet sent from the host apparatus.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Illustrative embodiments of printing systems, image forming apparatuses and proxy response methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the printing system, the image forming apparatus, and the proxy response method as the illustrative embodiments, even in the case where a communication error has occurred on wireless communications between an image forming apparatus as a base unit to which a proxy response has been requested and a host apparatus, instructions sent from the host apparatus can be properly executed.

The reason is that, the image forming apparatus as the base unit to which the proxy response has been requested, determines whether a communication error has occurred on receiving a packet sent through the wireless network from the host apparatus, and on determining that the communication error has occurred, instructs another image forming apparatus (an image forming apparatus which has requested the proxy response and/or one of the image forming apparatuses in the waiting state) to receive a packet sent from the host apparatus though the wireless network.

By conducting such the control, in the printing system within the same network, image forming apparatuses other than the image forming apparatus as the base unit can be set in the power saving state (can be operated in the power saving mode) where at least the power of their wireless network interface is shut down. Therefore, the total power consumption of the system can be reduced. Further, by switching the base unit to another image forming apparatus in the printing system, the occurrence of communication errors is prevented, which can hardly cause lowering of the throughput.

As illustrated in the description about the background, the following proxy response method is known. There is provided an image forming apparatus working in a power saving mode in which power of its wireless network interface is completely shut down and its wired network interface accepts only an activation request. When a host apparatus sends a print request through the wireless network to the above image forming apparatus, an image forming apparatus as a base unit, in which its wireless network interface is working, receives the packet from the host apparatus on behalf of the above image forming apparatus working in the power saving mode and activates the above image forming apparatus in the power saving mode through the wired network.

However, this proxy response method can cause the following situation. That is, in cases where an image forming apparatus directly conducts wireless communications with the host apparatus, a communication error may occur depending on the positional relationship between the image forming apparatus as the base unit and the host apparatus, when the image forming apparatus as the base unit receives the packet sent from the host apparatus through the wireless communication. Therefore instructions sent from the host apparatus may not be properly executed.

In one embodiment of the present invention, an image forming apparatus in the waiting state is configured to receive a packet sent from a host apparatus to an image forming apparatus in the power saving state on behalf of the image forming apparatus in the power saving state, and on determining that a communication error has occurred on receiving the packet, instruct another image forming apparatus connected to the wired network (for example, one of another image forming apparatuses in the waiting state) to receive a packet sent from the host apparatus. Optionally, the image forming apparatus in the waiting state may be configured to, on determining that a communication error has occurred on receiving the packet, send the image forming apparatus in the saving mode an activation request through the wired network, and instruct the image forming apparatus in the power saving mode to receive a packet sent from the host apparatus. Thus, even in the case where a communication error has occurred in the wireless communications, instructions sent from the host apparatus can be properly executed.

EXAMPLE

First Example

Figure 1:
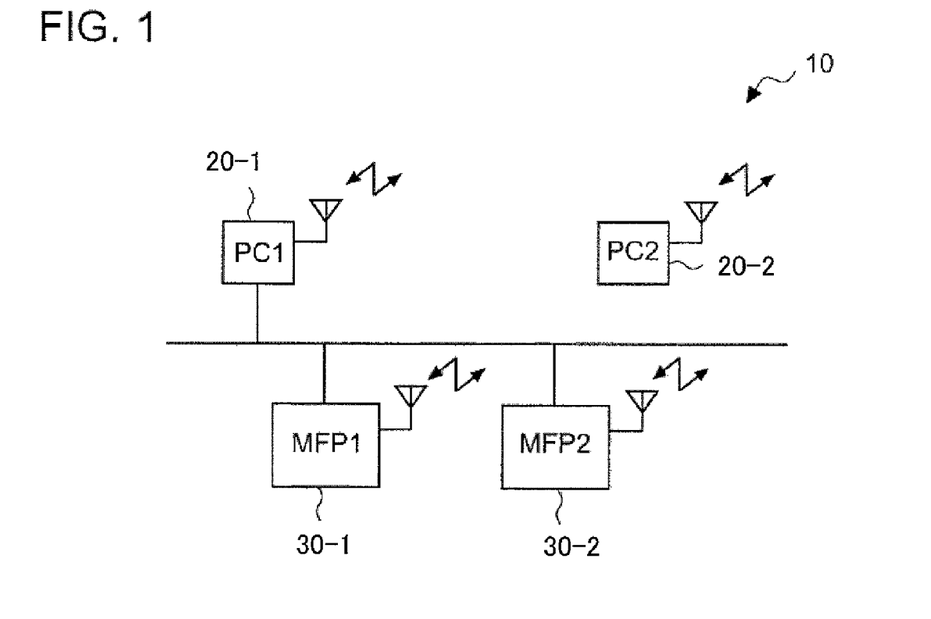
FIG. 1 schematically illustrates the configuration of a printing system relating to the first example.
Figure 2:
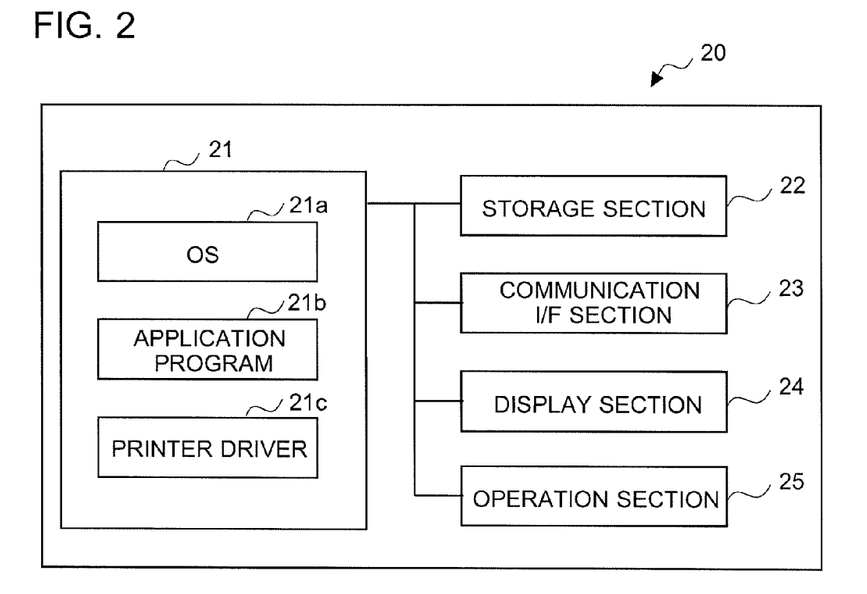
FIG. 2 is a block diagram illustrating the configuration of a host apparatus relating to the first example.
Figure 3:
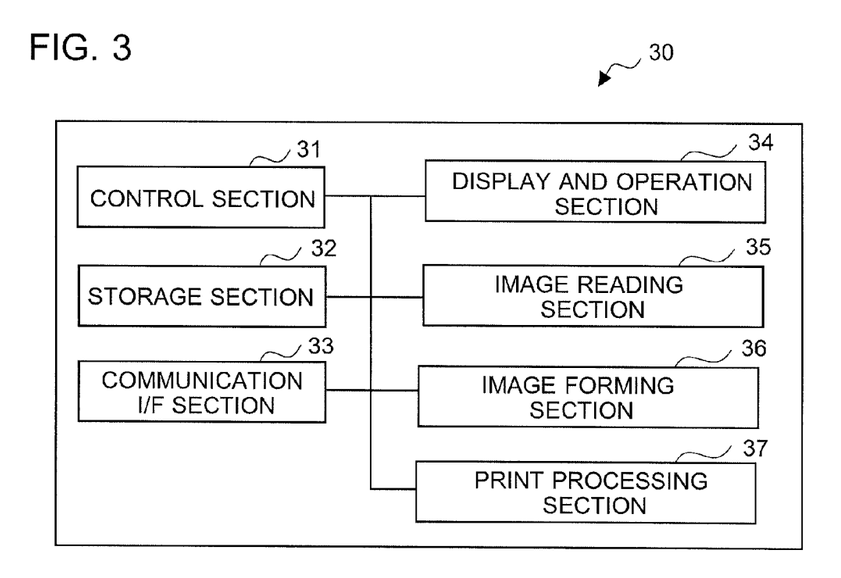
FIG. 3 is a block diagram illustrating the configuration of an image forming apparatus relating to the first example.
Figure 4:
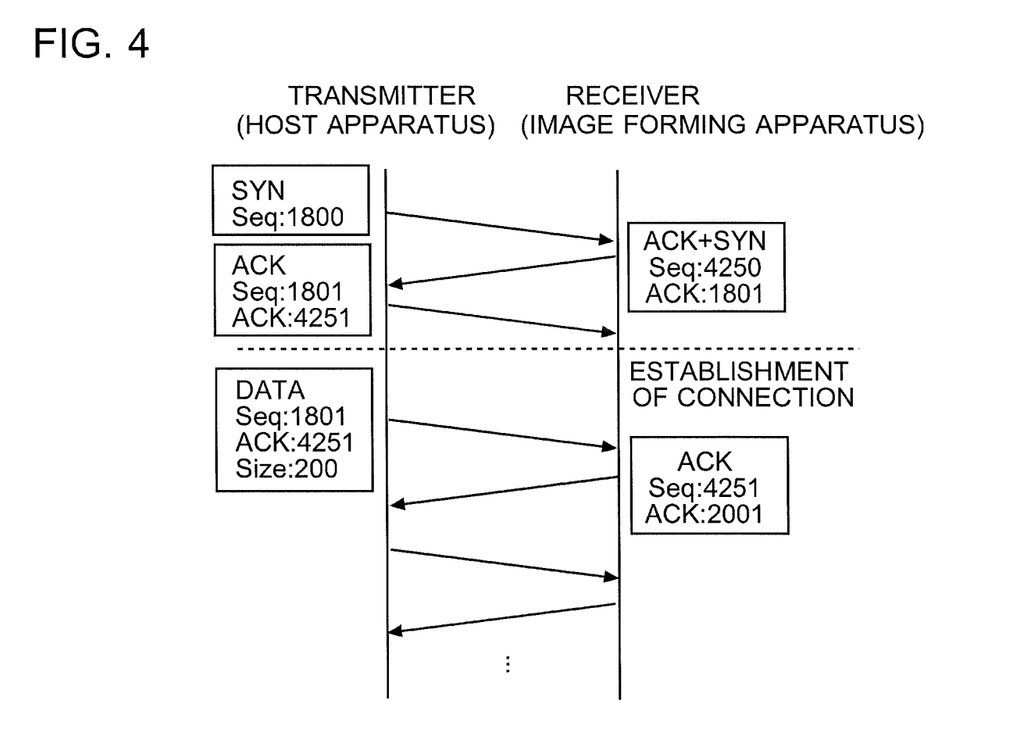
FIG. 4 is a sequence diagram illustrating operations of the printing system (in case of a normal communication being conducted)
Figure 5:
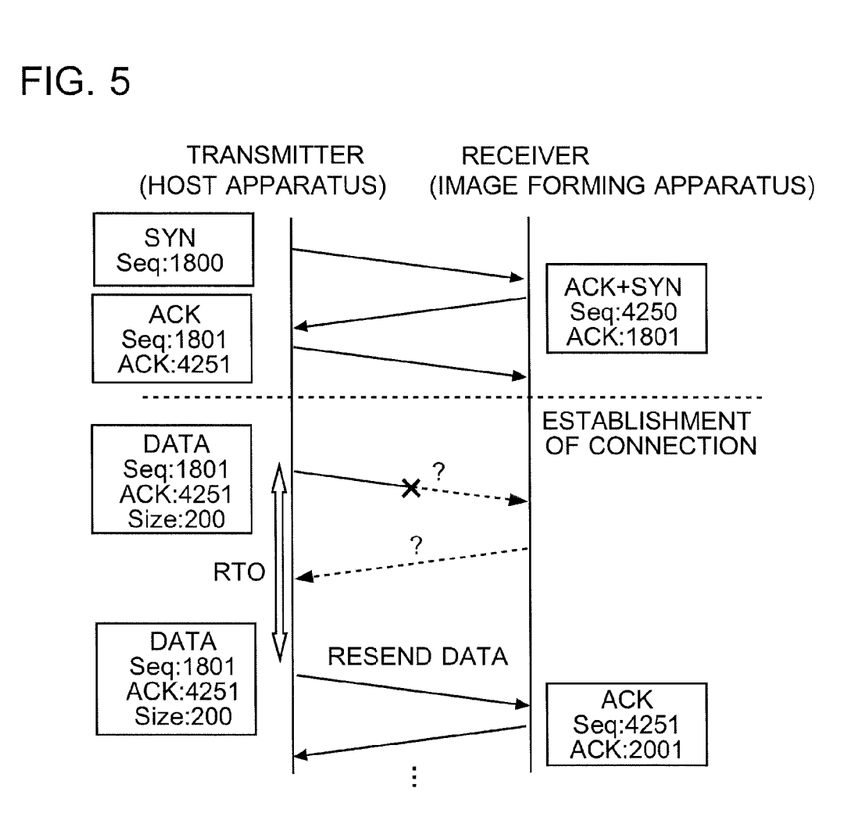
FIG. 5 is a sequence diagram illustrating operations of the printing system (in case of a communication error has occurred)
Figure 6:
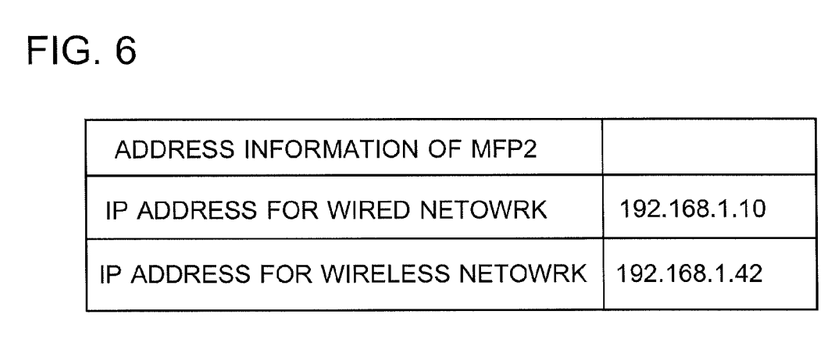
FIG. 6 illustrates an example of network address information of a sub-unit administered by an image forming apparatus as a base unit.
Figure 7:
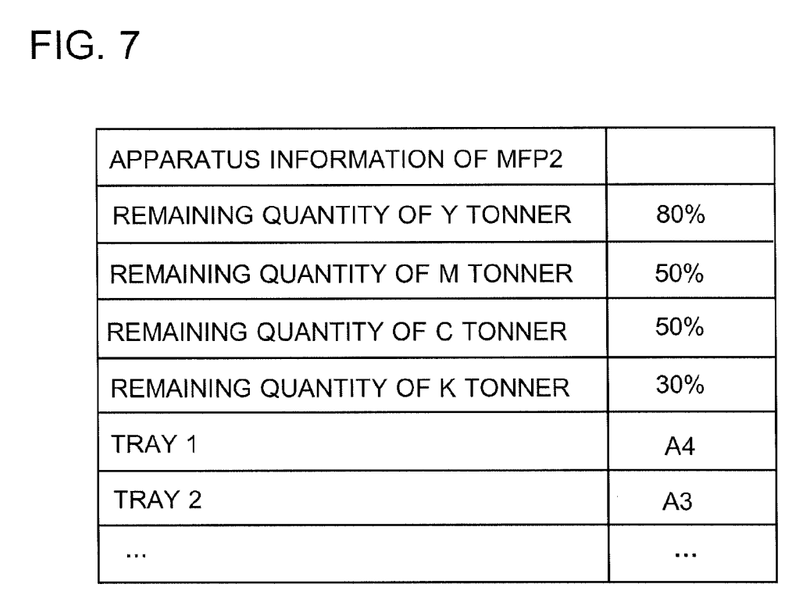
FIG. 7 illustrates an example of apparatus information of a sub-unit, administered by an image forming apparatus as a base unit.
Figure 8:
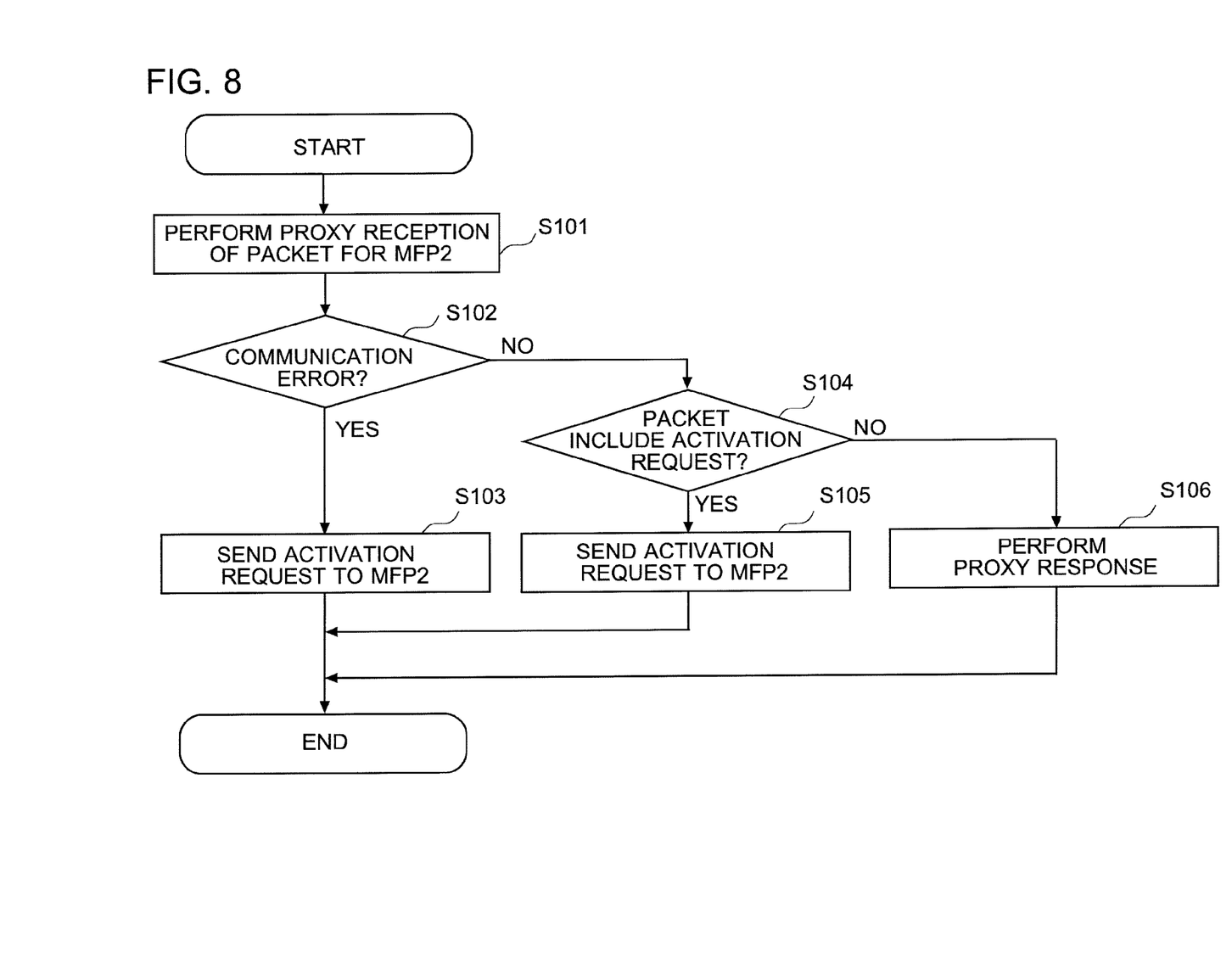
FIG. 8 is a flow chart illustrating operations of the image forming apparatus as the base unit relating to the first example.
Figure 9:
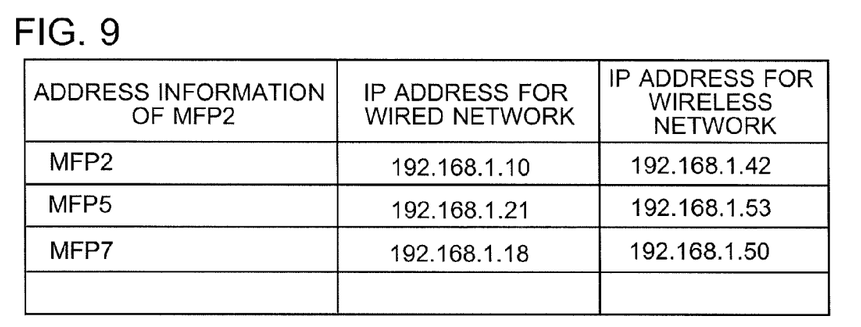
FIG. 9 illustrates an example of network information of plural sub-units administered by the image forming apparatus as the base unit.
Figure 10:
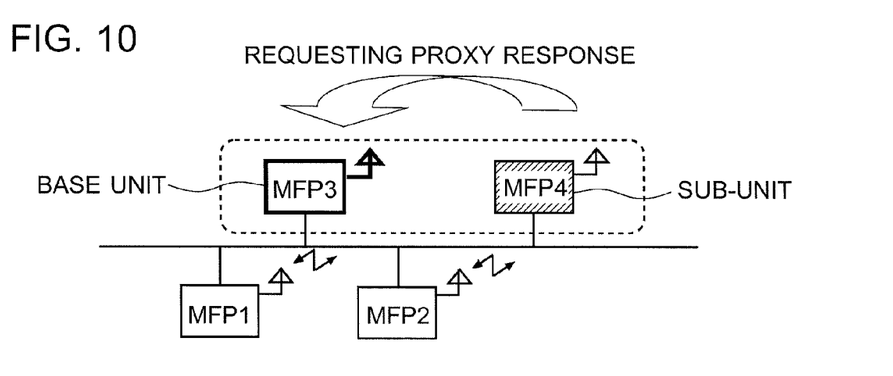
FIG. 10 schematically illustrates a proxy response method relating to the first example in the printing system.

In order to explain the illustrative embodiments of the present invention in detail, the printing system, the image forming apparatus and the proxy response method relating to the first example will be described by referring to FIGS. 1-10. FIG. 1 is a diagram schematically illustrating the configuration of a printing system relating to the present example; FIG. 2 is a block diagram illustrating the configuration of a host apparatus; FIG. 3 is a block diagram illustrating the configuration of an image forming apparatus of the present example; FIGS. 4 and 5 are sequence diagrams illustrating operations of the printing system; FIGS. 6 and 9 illustrate examples of network address information; FIG. 7 illustrates an example of apparatus information; FIG. 8 is a flow chart illustrating operations of the image forming apparatus as the base unit of the present example; and FIG. 10 is a schematic diagram illustrating a proxy response method of the printing system.

As shown in FIG. 1, printing system 10 of the present example includes print instruction apparatuses (hereinafter referred as host apparatuses 20 or 20-1 and 20-2) configured to send instructions regarding a print, and a plurality of image forming apparatuses 30 or 30-1 and 30-2 configured to execute processing with respect to the instructions regarding the print, which are connected through the communication network. Each device will be described in detail below.

Host Apparatus:

Host apparatuses 20 include host apparatus 20-1 (PC1 in FIG. 1) such as a desk top computer apparatus, and portable host apparatus 20-2 (PC2 in FIG. 1) such as a tablet terminal, a smart-phone and a note computer apparatus. As shown in FIG. 2, the host apparatus 20 is composed of control section 21, storage section 22, communication interface (I/F) section 23, display section 24, operation section 25.

Control section 21 is composed of a CPU (Central Processing Unit) and memories such as a ROM (Read Only Memory) and a RAM (Random Access Memory). The CPU is configured to read out programs including OS (Operating System) 21a and application program 21b for controlling operations of host apparatus 20, and printer driver 21c for controlling image forming apparatuses 30, from the ROM or storage section 22, and develop and execute them on the RAM. The control section 21 is configured to generate print data by use of printer driver 21c based on document data formed by using application program 21b, and send a packet to instruct printing to a desired image forming apparatus 30 with designating IP (Internet Protocol) address.

Storage section 22 is composed of a memory such as a HDD (Hard Disk Drive), to store programs, document data, print data, and the like.

Communication interface section 23 is composed of a device such as a NIC (Network Interface Card), a modem and the like, and is configured to exchange data communications with each image forming apparatus 30 by using a wireless network, or by using wired and wireless networks.

Display section 24 is composed of a device such as an LCD (liquid Crystal Display), and is configured to display a screen for forming a document by the use of application program 21b and a screen for indicating a print by the use of printer driver 21c.

Operation section 25 includes a mouse and keyboard, and is configured to allow a user to perform operations such as a document creation by using application program 21b and a print instruction by using print driver 21c.

Image Forming Apparatus:

Image forming apparatuses 30 include an image forming apparatus which makes (performs) a proxy response (hereinafter referred as a base unit) and an image forming apparatus which requests the base unit to perform the proxy response (hereinafter referred as a sub-unit). Each of image forming apparatuses 30 is configured to operate in two types of state, the waiting state (normal working mode) and the power saving state (power saving mode). Here, the waiting state is a state where the mage forming apparatus can immediately execute a process upon receiving an instruction such as a print instruction. The power saving state is a state where power is supplied to only the minimum functions and at least the power of the wireless network interface is shut down. Each image forming apparatus 30 is configured to, in the power saving state, in response to receiving a packet of an activation request from outside through the wired network interface, supply power to respective functions and be restored from the power saving state to change into the waiting state.

As shown in FIG. 3, each image forming apparatus 30 includes control section 31, storage section 32, communication interface section 33, display and operation section 34, image reading section 35, image forming section 36 and print processing section 37.

Control section 31 is composed of a CPU and memories such as a ROM and a RAM. The CPU is configured to read out various programs from the ROM or memory section 32, and develop and execute them on the RAM.

Control section 31 of the base unit is configured to acquire apparatus information and address information (IP address) of the sub-unit for the wireless network and wired network from the sub-unit, where the sub-unit is an image forming apparatus which has requested the proxy response to the base unit, and receive a packet sent through the wireless network from host apparatus 20 to the sub-unit, by using the acquired IP address for the wireless network. Control section 31 of the base unit is further configured to, in cases where the received packet includes a restoring request to the sub-unit from the power saving state, send an activation request to the sub-unit by using the IP address for the wired network, and in cases where the received packet does not include the restoring request to the sub-unit, perform the proxy response on behalf of the sub-unit. Further, control section 31 of the base unit is configured to determine whether a communication error has occurred on the reception the packet, and to, on determining that a communication error has occurred on the reception of the packet, send the activation request to the sub-unit through the wired network to awake the sub-unit and instruct the sub-unit to receive a packet sent from host apparatus 20.

Control section 31 of the sub-unit is configured to, on requesting a proxy response to the base unit, send its address information of the own sub-unit for the wireless network and wired network and the apparatus information of the own sub-unit to the base unit, after that, change the operation state of the own sub-unit to the power saving state. Further, control section 31 of the sub-unit is configured to, on receiving the restoring request from the base unit through the wired network, change the operation state of the own apparatus from the power saving state to the waiting state.

Storage section 32 is composed of a memory such as a HDD, to store programs, print data, the above described network address information and apparatus information, and the image data processed by its own apparatus.

Communication interface section 33 is composed of a device such as a NIC, a modem and the like, and is configured to exchange data communications with host apparatus 20 through the wireless network or through the wireless and wired networks and further exchange data communication with the other image forming apparatuses 30 through the wired network.

Display and operation section 34 includes a touch panel provided with a pressure sensitive operation section in which transparent electrodes are arranged in a reticular pattern, and is configured to display a screen for operating image forming apparatus 30 and a screen for setting print conditions, and allow a user to perform various settings and instructions.

Image reading section 35, which is configured to optically read out image data from the original document on an original platen, includes a light sours to scan the original document, an image sensor such as a CCD (Charge Coupled Devices) to convert the reflected light from the original document into electrical signals, and an A/D converter to execute A/D conversion.

Image forming section 36 is configured to analyze print data and generate image data of each page by rasterizing each page of the image data, or is configured to acquire the image data of each page from image reading section 35, and convert the acquired image data into image data printable with print processing section 37 through image processing (color adjustment, density adjustment, size adjustment, etc.) and/or screening as necessary.

Print processing section 37, being composed of components necessary for image formation utilizing image forming process such as an electrophotographic system or an electrostatic recording system, is configured to print images based on the image data readout through image reading section 35 or the image data received through communication interface section 33, on a specified sheet of paper.

Hereinafter, common operations of the printing system 10 will be described referring to FIG. 1. MFP1 and MFP2 of FIG. 1 are image forming apparatuses 30 (30-1, 30-2) each provided with two types of network interfaces of a wired network interface and a wireless network interface, and arranged on one and the same wired network. Each of image forming apparatuses 30 has IP addresses of the wired network and the wireless network, and is configured to receive a packet from outside. In case a user wants to execute printing with image forming apparatus 30, the user sends a print request to the IP address of the concerning image forming apparatus 30 from the computer apparatus (the host apparatus 20-1; PC1) or from a portable terminal (the host apparatus 20-2; PC2) via a printer driver.

Data transmission and reception in this case are conducted according to TCP (Transmission Control Protocol). Here, outlines of a general TCP will be described. As shown in the sequence diagram of FIG. 4, firstly a transmitter (host apparatus 20) sends receiver (image forming apparatus 30) a data transfer permission request as a SYN packet (synchronous packet). When accepting the request, the receiver (image forming apparatus 30) sends the transmitter a notice of permission as an ACK packet (acknowledgement packet). At that time the transmitter and receiver exchange their information of IP addresses, ports, and window sizes with each other in accordance with the format of the TCP header. The information exchange necessary to establish the connection is called three-way handshake. Then upon establishment of the connection, the transmitter and receiver conduct data transmission and reception.

During these data exchanges, there may be caused a situation that a packet sent from one side does not arrive to the other side, or the ACK packet (acknowledgement packet) sent from one side is not returned to the other side, because of some troubles occurred in the course of the sequence. Under the situation, as shown in FIG. 5, the transmitter resends the same packet after waiting a predetermined resend timeout period (RTO). The transmitter increases the value of RTO twice at the time of executing every resending operation, with maximum value of 64 seconds. Although this control is established for surely sending the data, the data transfer is so much delayed that the original throughput cannot be provided in case that troubles have occurred during the data communication.

Next, common operations for a proxy response at the time of power saving mode will be described. Image forming apparatus 30 does not supply electric power to its wireless network interface during the power saving mode and the function of the wireless LAN (Local Area Network) is shut off. When host apparatus 20 sends the image forming apparatus 30 a packet through the wireless network under this condition, the image forming apparatus 30 cannot receive the packet. In view of that, the other image forming apparatus 30 on the same wired network is set as a base unit. When an inquiry comes to image forming apparatus 30 in the power saving mode from outside, the base unit perform a proxy response for the image forming apparatus 30 in the power saving mode. When a print request comes to image forming apparatus 30 in the power saving mode, the base unit sends through the wired network a packet of activation request to the image forming apparatus 30 in the power saving mode to be restored from the power saving mode.

An illustrative example of the above operations will be described based on the configuration of FIG. 1.

At the time of transition to the power saving mode in image forming apparatus 30-2 (MFP2 in this case), the image forming apparatus 30-2 (MFP2 in this case) defines a base unit (MPF1 in this case) among image forming apparatuses 30 in the waiting mode on the same wired network, based on the priority order (for example, the order of increasing power consumption, the order of the decreasing number of functions, the order of increasing distance between the installation position and the room center) predetermined by a user. Then, the image forming apparatus 30-2 (MFP2) sends MFP1 its own network address information (refer to FIG. 6) made up with the IP address of the wired network and IP address of the wireless network, and the apparatus information (refer to FIG. 7) such as a toner remaining quantity and tray information, together with the proxy response request.

In the present example, the configuration is adopted that the sub-unit (MFP2) to send a proxy response, sends the network address information and the apparatus information to the base unit (MFP1) to perform the proxy response. In case that each image forming apparatus 30 is configured to accept an SNMP (Simple Network Management Protocol), the image forming apparatus 30 may store the network address information and the apparatus information as objects in a tree-structured MIB (Management Information Base). Under this situation, the base unit (MFP1) may acquire the network address information and the apparatus information of the sub-unit (MFP2) by designating an OID (Object Identifier) using an SNMP manager command.

After receiving the proxy response request and the above described network address information and apparatus information from MFP2, the base unit (MFP1) returns acknowledgement of safe receipt to MFP2. Thus, MFP2 acts as the sub-unit of MFP1, and the base unit (MFP1) receives a packet for the sub-unit, when host apparatus (PC2) sends a packet to the IP address ("192.168.1.42" in this case) of the sub-unit (MFP2) for the wireless network.

If the received packet is a print request, the base unit (MFP1) sends an activation request to the sub-unit (MFP2) through the IP address ("192.168.1.10" in this case) of the sub-unit (MFP2) for the wired network, to make the sub-unit (MFP2) restored from the power saving mode. Then the sub-unit (MFP2) exchanges print data with the host apparatus (PC2) to execute the print processing.

If the content of the received packet is other than the print request, the base unit (MFP1) performs the proxy response by itself without doing any action to the sub-unit (MFP2). Further, if the content of the received packet other than the print request is to request the apparatus information, the base unit makes a response based on the apparatus information (refer to FIG. 7) having acquired from the sub-unit (MFP2) at the time of the transition of the sub-unit into the power saving mode. Further, when an operation to restore the sub-unit (MFP2) from the power saving mode is executed directly onto the sub-unit (such as a case that a panel operation is executed), the sub-unit (MFP2) sends a canceling request of the proxy response to the base unit (MFP1), to cancel the base unit/sub-unit relationship.

In the situation of using portable host apparatus 20-2 (PC2), a case is expected that the print request is forwarded to the image forming apparatus 30-2 (MFP2) being installed at near place from the host apparatus 20-2. In that case, since the distance between the host apparatus 20-2 (PC2) and the image forming apparatus 30-2 (MFP2) short enough and few barrier is expected, a proper quality of the wireless communication can be maintained between the host apparatus 20-2 and the image forming apparatus 30-2.

However, under the situation that the image forming apparatus 30-2 (MFP2) is requesting the proxy response to the image forming apparatus 30-1 (MFP1), a user of host apparatus 20-2 (PC2) intends to send a print request to the image forming apparatus 30-2 (MFP2), but what actually receives the print request is MFP1 (the image forming apparatus 30-1) acting as the base unit of MFP2. Since the MFP1 is not necessarily installed near the host apparatus 20-2 (PC2), the quality of wireless communication may not be sufficiently maintained. Due to this, the wireless communication is not properly executed, which causes the host apparatus to resend the packet because of failure of the packet reception and failure of the return of the ACK and results in a significant throughput decrease, or even disabling of the communications so as to terminate the connection.

Therefore, according to the present example, the image forming apparatus 30-1 as the base unit, in response to determining that a communication error has occurred on the wireless communication with the host apparatus 20-2, sends an activation request to image forming apparatus 30-1 as the sub-unit through the wired network, regardless of the packet contents, and sends an instruction to receive the packet from host apparatus 20-2 to the image forming apparatus 30-1 as the base-unit.

The above communication error includes the following situations in the sequence diagrams of FIGS. 4 and 5. For example, one of the situations is that where the image forming apparatus 30-1 has already sent a "ACK+SYN" packet to the host apparatus 20-2 in response to receiving a SYN packet but does not receive an ACK packet from the host apparatus 20-2 yet, and another of the situation is that where the image forming apparatus 30-1 has already sent an ACK packet to the host apparatus 20-2 in response to receiving data but does not receive the succeeding data from the host apparatus 20-2 yet (in other words, the situation where the amount of the data received in a certain period of time is insufficient).

Hereinafter, operations of the above image forming apparatus 30-1 (MFP1) will be described in detail referring to the flow chart of FIG. 8. In the operations, it is assumed that the image forming apparatus 30-1 (MFP1) as the base unit has received, from the image forming apparatus 30-2 (MFP2) as the sub-unit, the proxy response request, network address information and the apparatus information of the sub-unit.

Firstly, control section 31 of the image forming apparatus 30-1 (MFP1) as the base unit performs a proxy reception of a packet sent from the host apparatus 20-2 toward the image forming apparatus 30-2 as the sub-unit (MFP2) on behalf of the MFP2 by the use of wireless network IP address acquired from the MFP2 (S101). Specifically, as shown in the sequence diagrams of FIGS. 4 and 5, the control section 31 of the MFP1 receives a SYN packet from the host apparatus 20-2, sends a "ACK+SYN" packet in reply to the SYN packet, and receives an ACK packet to establish the connection. After that, by sequentially receiving data from the host apparatus 20-2, the control section 31 of the MFP1 sequentially sends ACK packets in reply to the received data.

In this series of sequence, the control section 31 of the image forming apparatus 30-1 (MFP1) as the base unit determines whether a communication error has occurred (S102). Specifically, when not receiving the ACK packet sent from the host apparatus 20-2 in reply to the "ACK+SYN" packet for a predetermined period, or not receiving a data packet sent from the host apparatus 20-2 for a predetermined period even after the establishment of connection, the control section 31 of the MFP1 determines that a communication error has occurred.

Then, on determining that a communication error has occurred, the control section 31 of the MFP1 sends an activation request to the MFP2 by using the IP address for the wireless network acquired from the MFP2, and instructs the MFP2 to receive the packet (S103).

On the other hand, on determining that no communication error has occurred, the control section 31 of MFP1 further determines whether the received packet includes an activation request to MFP2 (S104). If the packet includes an activation request, the control section 31 of the MFP1 sends an activation request to the MFP2 by using the IP address for the wired network acquired from the MFP2 (S105). If the packet does not include an activation request, the MFP1 performs a proxy response such as notification of the apparatus information of MFP2 (S106).

Although described here is the case where the image forming apparatus 30-1 (MFP1) as the base unit performs the proxy response for only one image forming apparatus 30-2 (MFP2) as the sub-unit, the base unit may perform a proxy responses for a plurality of sub-units. In that case, the base unit may store the IP addresses of the plurality of sub-units for the wireless and wired networks as a list (as shown in FIG. 9), and control the sub-units for which the proxy response is currently being performed with adding/canceling items of the list as needed.

For example, in the system configuration of FIG. 10, considering a situation that at the start of preparation for the transition of MFP2 to the power saving mode, there exists an image forming apparatus 30 (MFP3) acting as a base unit for another image forming apparatus (MFP4) in the power saving mode, the image forming apparatus 30 (MFP2), which is going to request a proxy response, selects the MFP3 as the base unit thereof rather than MFP1. Thereby, the number of the image forming apparatuses 30 operating in the waiting state can be decreased, which reduces the total power consumption of printing system 10.

As described above, according to the present example, the image forming apparatus 30 as the base unit to which the proxy response has been requested makes an activation request through the wired communication network to the image forming apparatus as the sub-unit, on determining that a communication error has occurred during the wireless communication with the host apparatus 20. Therefore, even when a communication failure has occurred in the wireless communications depending on the positional relationship with the host apparatus 20, instructions sent from host apparatus 20 can be surely executed.

Second Example

Figure 11:
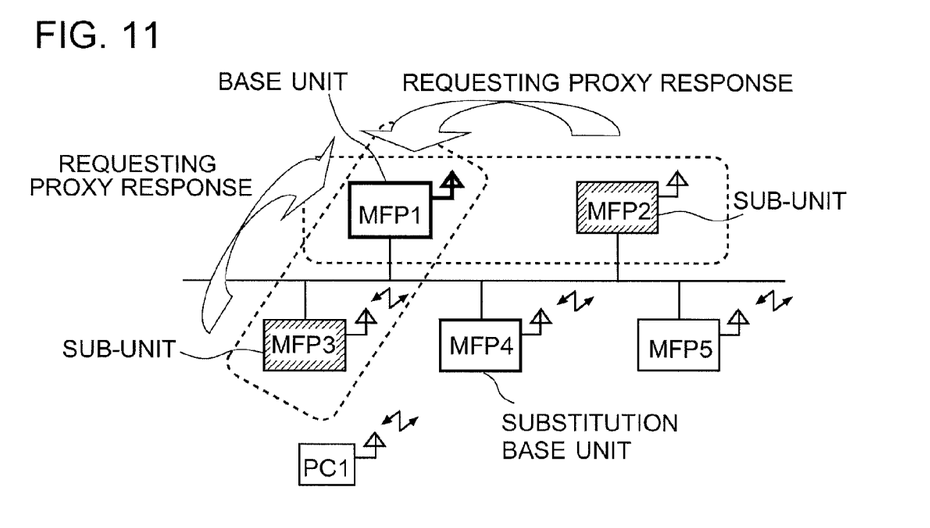
FIG. 11 schematically illustrates a proxy response method relating to the second example in the printing system.
Figure 12:
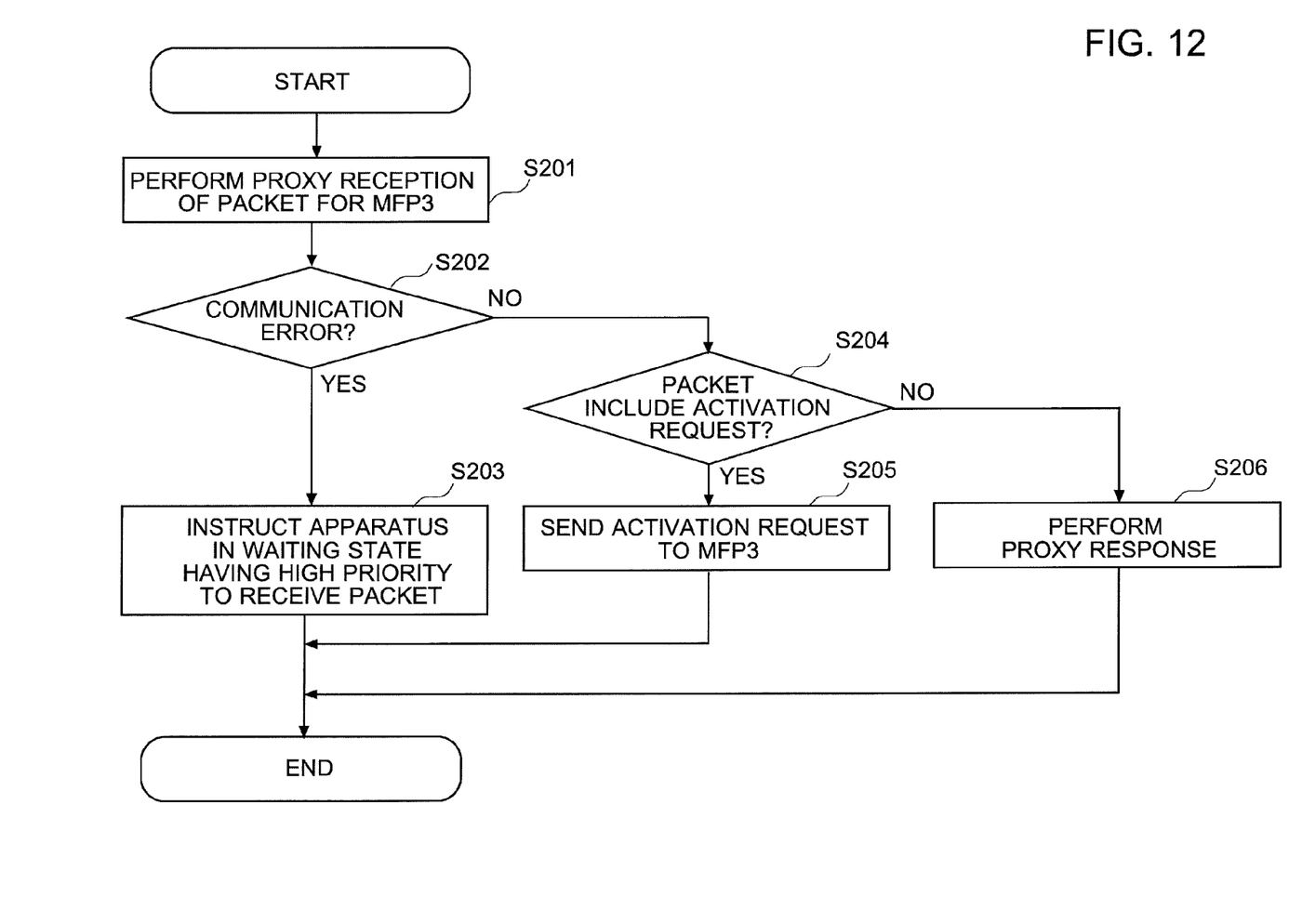
FIG. 12 is a flow chart illustrating operations of an image forming apparatus as a base unit relating to the second example.
Figure 13:
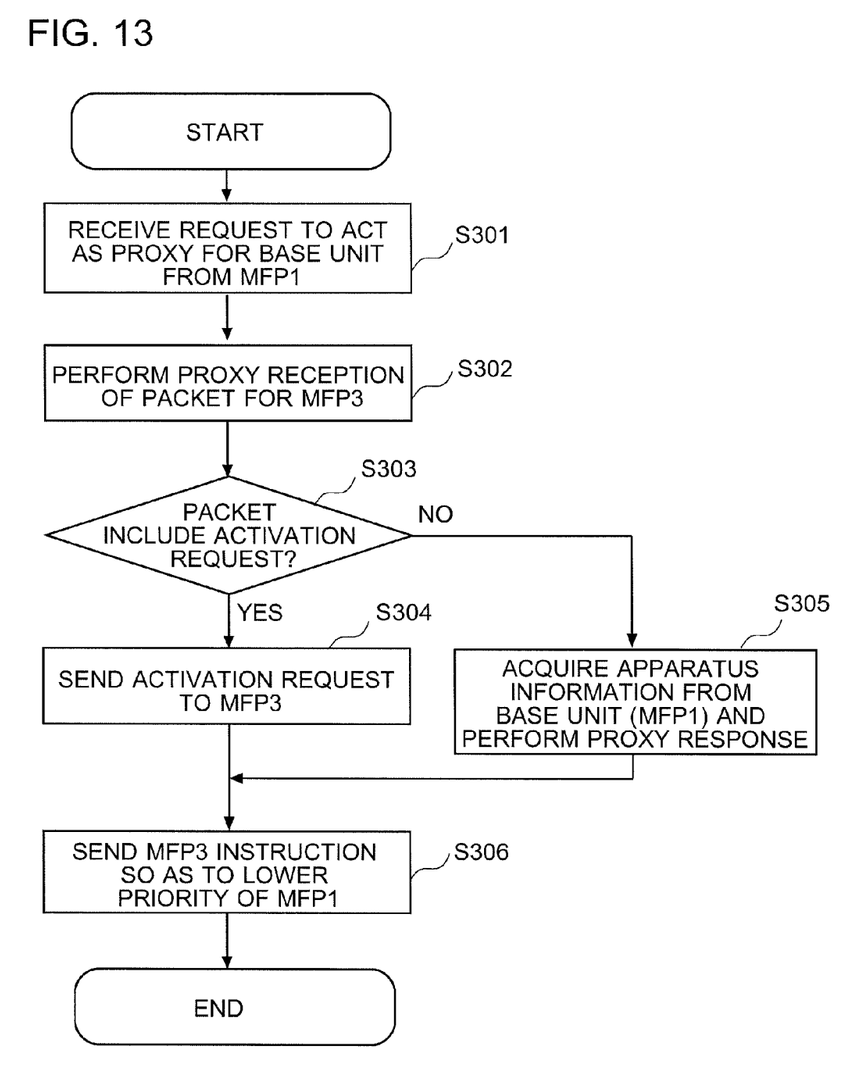
FIG. 13 is a flow chart illustrating operations of the image forming apparatus as a substitution base unit relating to the second example.

Next, a printing system, image forming apparatus and proxy response method relating to the second example will be explained by referring to FIGS. 11-13. FIG. 11 is a diagram schematically illustrating the configuration of printing system relating to the present example. FIG. 12 is a flow chart illustrating operations of an image forming apparatus as a base unit, and FIG. 13 is a flow chart illustrating operations of an image forming apparatus as a substitution base unit.

In the above described first example, on determining that a communication error has occurred in the wireless communications, the image forming apparatus 30 as the base unit makes the image forming apparatus 30 as the sub-unit, which has requested a proxy response, wake-up on the transition into the power saving mode. On the other hand, in the present example, in order to attaining the reduced power consumption of the whole printing system 10, the image forming apparatus 30 as the base unit controls another image forming apparatus 30 under the waiting mode to receive a packet sent from the host apparatus 20, rather than controls the image forming apparatus as the sub-unit under the power saving mode to wake-up so as to receive the packet. The proxy response method of the image forming apparatus as the base unit in that case will be described below.

For example, as shown in FIG. 11, it is assumed that plural image forming apparatuses 30 are connected to the same wired network (in this case five units of MFP1 to MFP5), MFP2 and MFP3 among them have been already working under the power saving mode, and each of the MFP2 and MFP3 is requesting a proxy response to MFP1. Further, MFP4 and MFP5 are assumed to be in the waiting state.

In the above described configurations, in case that the host apparatus 20 (PC1 in this case) having a wireless communication function is going to send a print request to MFP3, the base unit (MFP1) tries to receive the packet because the MFP3 has requested a proxy response to the base unit (MFP1). On determining that a certain communication error has occurred during the wireless communication, similarly to the first example, the base unit (MFP1) sends, if image forming apparatuses 30 in the waiting state are available in the same network, a request to receive the packet to image forming apparatus 30 having a high priority among the available image forming apparatuses in the waiting state.

Then, assuming that MFP4 is selected as image forming apparatus 30 with a higher priority than other image forming apparatuses 30 in the waiting state, MFP4 receives a packet sent from the host apparatus 20 (PC1). If the received packet is a print request, the MFP4 sends an activation request to MFP3 to make it wake-up, as the original base unit (MFP1) should do. If the received packet is other than the print request, the MFP4 acquires necessary information (network address information of FIG. 6 and apparatus information of FIG. 7) from the original base unit (MFP1), and performs a proxy response to host apparatus 20 (PC1) on behalf of the MPF1 acting as proxy of MFP3. Namely, the MFP4 acts as a substitution for the base unit (MFP1).

The priority order of the image forming apparatus 30 under the waiting state acting as the substitution of base unit (MFP1) can be arbitrarily settable. For example, since the host apparatus 20 (PC1) is expected to send a print instruction to the image forming apparatus 30 placed near its own apparatus (PC1) in many cases, the base unit (MFP1) may select one of the image forming apparatuses 30 and request it to work as the substitution of the base unit (a substitution base unit), in order of increasing distance of the image forming apparatuses 30 from the sub-unit (MFP3) which has requested a proxy response. By requesting the image forming apparatus 30, which is placed near the sub-unit of MFP3 (namely, which should be near to the host apparatus 20 (PC1)), to act as the substitution base unit, the occurrence possibility of a communication error can be decreased.

Further, the base unit (MFP1) may select one of image forming apparatuses 30 and request it to act as a substitution base unit, in order of increasing power consumption in the waiting state. By requesting the image forming apparatus 30 of less power consumption to act as the substitution base unit, the total power consumption of printing system 10 can be decreased.

After executing the above described control, at the time the sub-unit (MFP3) has been restored from the power saving mode, the substitution base unit (MFP4) may send the sub-unit (MFP3) one of an instruction to raise the priority of the substitution base unit (MFP4), an instruction to lower the priority of the original base unit (MFP1), or an instruction to do the both. Such the instruction allows the sub-unit (MFP3), at the time of transition to the power saving mode of the sub-unit again, to request a proxy response directly to the MFP4, which may be able to prevent the occurrence of communication error.

Hereinafter, operations of printing system 10 of the present example will be described. First, operations of the original base unit (MFP1) will be described referring to the flow chart of FIG. 12. Each image forming apparatus 30 of the printing system 10 is assumed to be configured to acquire the state of other image forming apparatuses by using the MIB information.

By using the IP address of the wireless network acquired from the sub-unit (MFP3), the control section 31 of the original base unit (MFP1) performs a proxy reception of a packet sent to the MFP3 from the host apparatus 20 (S201), and determines whether a communication error has occurred on receiving the packet (S202). Specifically, similarly to the first example, when not receiving an ACK packet sent from the host apparatus 20-1 in reply to a "ACK+SYN" packet for a predetermined period, or no receiving a data packet sent from the host apparatus 20 for a predetermined period even after the establishment of connection, the control section 31 of the original base unit (MFP1) determines that a communication error has occurred.

Then, on determining the occurrence of communication error, the control section 31 of the base unit (MFP1) instructs image forming apparatus 30 (MFP4) having the higher priority than the other image forming apparatuses 30 in the waiting state to receive the packet (S203). At that time, the control section 31 notifies the MFP4 the network address information and the apparatus information acquired from the sub-unit (MFP3).

On the other hand, on determining that no communication error has occurred, the control section 31 of the base unit (MFP1) further determines whether the received packet includes an activation request to MFP3 (S204). If the packet includes an activation request, the control section 31 of the MFP1 sends an activation request to the MFP3 by using the IP address for the wired network acquired from the MFP3 (S205). If the packet does not include an activation request, the MFP1 performs a proxy response such as notification of the apparatus information of MFP3 (S206).

Next, operations of the substitution base unit (MFP4) will be described referring to the flow chart of FIG. 13. It is assumed that the substitution base unit (MFP4) has acquired the network address information and apparatus information of the sub-unit (MFP3) from the original base unit (MFP1).

On receiving a request to act as proxy for the base unit from the original base unit (MFP1) (S301), control section 31 of the substitution base unit (MFP4) performs a proxy reception of a packet sent from the host apparatus 20 to the MFP3, by using the IP address of the sub-unit (MFP3) for the wireless network (S302).

Then the control section 31 of the substitution base unit (MFP4) determines whether the received packet includes an activation request to MFP3 (S303). If the packet includes the activation request to MFP3, the control section 31 of the MFP4 sends an activation request to the MFP3 by using the IP address of MPF3 for the wired network (S304). If the packet does not include the activation request to MFP3, the MFP4 performs a proxy response such as notification of the apparatus information of MFP3 (S305). Then, when the sub-unit (MFP3) restored from the power saving mode, the control section 31 of MFP4 sends the MFP3 one of an instruction to raise the priority of the own unit (MFP4), or an instruction to lower the priority of the original base unit (MFP1), or an instruction to do the both (S306).

As described above, according to the present example, on determining that a communication error has occurred during the wireless communication with the host apparatus 20, the image forming apparatus 30 as the base unit to which a proxy response has been requested executes the control of requesting image forming apparatus 30 with the higher priory than the other image forming apparatuses in the waiting state to act as proxy for the base unit. Therefore, even in the case where a communication failure has occurred in the wireless communications depending on the positional relationship with the host apparatus 20, instructions from the host apparatus 20 can be surely executed.

The present invention should not be restricted to the above described example, but its configuration and control are arbitrarily changeable without departing from the spirit and scope of the present invention.

For example, although the second example illustrates an example that the image forming apparatus 30 to act as proxy for the base unit is selected from among the image forming apparatuses 30 under the waiting state, even image forming apparatus 30 under the power saving state may be requested to act as proxy for the base unit as far as the selected image forming apparatus 30 gives lowered power consumption in the waiting state. This case also enables to surely execute the instruction from the host apparatus 20 while decreasing the total power consumption of the printing system 10.

Further, though the above described examples provide the control regarding the printing system 10, such the control is applicable to a system including arbitrary apparatuses being changeable in two states of the waiting state and power saving state.

The invention claimed is:
1. A printing system comprising:
a plurality of image forming apparatuses that are communicable with each other, wherein each of the plurality of image forming apparatuses operates in one of:
a waiting state in which the each of the image forming apparatuses can perform print processing; and
a power saving state in which electric power is not supplied at least to an interface section of the each of the image forming apparatuses for a wireless network; and a host apparatus that is communicable with the plurality of the image forming apparatuses through the wireless network, wherein the plurality of image forming apparatuses comprises a base image forming apparatus and a sub image forming apparatus, the sub image forming apparatus comprises a control section that requests, on changing from the waiting state to the power saving state, another of the image forming apparatuses to make a proxy response to the host apparatus for the sub image forming apparatus, and the base image forming apparatus comprises a control section that:
  receives a request to make the proxy response from the sub image forming apparatus;
  receives, after receiving the request to make the proxy response, a packet for a print request sent through the wireless network from the host apparatus to the sub image forming apparatus that requested the proxy response,
  determines whether a communication error has occurred on receiving the packet, and
  when the base image forming apparatus determines that the communication error has occurred on receiving the packet, selects one of the image forming apparatuses in the waiting state to be instructed to receive the packet sent from the host apparatus according to one of: an order of increasing distance between the one of the image forming apparatuses and the sub image forming apparatus that has requested the proxy response; and an order of increasing power consumption under the waiting state.

2. The printing system of claim 1,
wherein the control section of the base image forming apparatus determines, on not receiving an acknowledgement packet from the host apparatus or not receiving data from the host apparatus after a connection has been established with the host apparatus, that the communication error has occurred.

3. A base image forming apparatus that operates in a printing system, the printing system comprising a plurality of image forming apparatuses that are communicable with each other and a host apparatus that is communicable with the plurality of the image forming apparatuses through a wireless network, wherein each of the plurality of image forming apparatuses operates in one of a waiting state in which print processing can be performed and a power saving state in which electric power is not supplied at least to an interface section thereof connected to the wireless network, the plurality of image forming apparatuses comprising a sub image forming apparatus and the base image forming apparatus, the sub image forming apparatus comprising a control section that requests, on changing from the waiting state to the power saving state, another of the image forming apparatuses to make a proxy response to the host apparatus for the sub image forming apparatus, the base image forming apparatus comprising:
  a print processing section that performs print processing in the waiting state;
  an interface section connected to the wireless network, wherein at least the interface section does not receive electric power in the power saving state; and
  a control section that:
    receives a request to make the proxy response from the sub image forming apparatus,
    receives, after receiving the request to make the proxy response, a packet for a print request sent through the wireless network from the host apparatus to the sub image forming apparatus that requested the proxy response,
    determines whether a communication error has occurred on receiving the packet, and
    when the base image forming apparatus determines that the communication error has occurred on receiving the packet, selects one of the image forming apparatuses in the waiting state to be instructed to receive the packet sent from the host apparatus according to one of: an order of increasing distance between the one of the image forming apparatuses and the sub image forming apparatus that has requested the proxy response; and an order of increasing power consumption under the waiting state.

4. The base image forming apparatus of claim 3,
wherein the control section of the base image forming apparatus selects, as the one of the image forming apparatuses, an image forming apparatus that was previously acting as the base image forming apparatus among the image forming apparatuses in the waiting state in the printing system.

5. The base image forming apparatus of claim 3,
wherein the control section of the base image forming apparatus determines, on not receiving an acknowledgement packet from the host apparatus or not receiving data from the host apparatus after a connection has been established with the host apparatus, that the communication error has occurred.

6. A proxy response method for use in a printing system, the printing system comprising a plurality of image forming apparatuses that are communicable with each other and a host apparatus that is communicable with the plurality of the image forming apparatuses through a wireless network, wherein each of the image forming apparatuses operates in one of a waiting state in which print processing can be performed and a power saving state in which electric power is not supplied at least to an interface section thereof connected to the wireless network, wherein the plurality of image forming apparatuses comprises a sub image forming apparatus and a base image forming apparatus, the sub image forming apparatus comprising a control section that requests, on changing from the waiting state to the power saving state, another of the image forming apparatuses to make a proxy response to the host apparatus for the sub image forming apparatus, the base image forming apparatus comprising a control section that makes, in response to receiving a request to make the proxy response from the sub image forming apparatus, the proxy response, the proxy response method comprising:
  operating the base image forming apparatus to receive a request to make the proxy request from the sub image forming apparatus,
  operating the base image forming apparatus to receive, after the request to make the proxy response, a packet for a print request sent through the wireless network from the host apparatus to the sub image forming apparatus that requested the proxy response,
  operating the base image forming apparatus to determine whether a communication error has occurred on receiving the packet, and
  operating the base image forming apparatus to select, when the base image forming apparatus determines that the communication error has occurred on receiving the packet, one of the image forming apparatuses in the waiting state to be instructed to receive the packet sent from the host apparatus according to one of: an order of increasing distance between the one of the image forming apparatuses and the sub image forming apparatus that has requested the proxy response; and an order of increasing power consumption under the waiting state.

7. The proxy response method of claim 6, further comprising:
operating the base image forming apparatus to select, as the one of the image forming apparatuses, an image forming apparatus that was previously acting as the base image forming apparatus among the image forming apparatuses in the printing system.

8. The proxy response method of claim 7, further comprising:
operating the image forming apparatus which has been instructed to receive a packet sent from the host apparatus to send the sub image forming apparatus at least one of an instruction to raise a priority for being selected as a substitution base image forming apparatus and an instruction to lower a priority of the base image forming apparatus.

9. The proxy response method of claim 7,
wherein the determining whether the communication error has occurred on receiving the packet in the base image forming apparatus, comprises operating the base image forming apparatus to determine, on not receiving an acknowledgement packet from the host apparatus or not receiving data from the host apparatus after a connection has been established between the base image forming apparatus and the host apparatus, that the communication error has occurred.

10. A non-transitory computer readable storage medium comprising computer program logic stored thereon for enabling a processor of an image forming apparatus in a printing system to perform a proxy response method, the printing system comprising a plurality of image forming apparatuses that are communicable with each other and a host apparatus that is communicable with the plurality of the image forming apparatuses through a wireless network, wherein each of the image forming apparatuses operates in one of a waiting state in which print processing can be performed and a power saving state in which electric power is not supplied at least to an interface section thereof connected to the wireless network, wherein the plurality of image forming apparatuses comprises a sub image forming apparatus and a base image forming apparatus, the sub image forming apparatus comprising a control section that requests, on changing from the waiting state to the power saving state, another of the image forming apparatuses to make a proxy response to the host apparatus for the sub image forming apparatus, the base image forming apparatus comprising a control section that makes the proxy response in response to receiving a request to make the proxy response from the sub image forming apparatus, the proxy response method comprising:
operating the base image forming apparatus to receive a request to make the proxy request from the sub image forming apparatus;
operating the base image forming apparatus to receive, after receiving the request to make the proxy response, a packet for a print request sent through the wireless network from the host apparatus to the sub image forming apparatus that requested the proxy response,
operating the base image forming apparatus to determine whether a communication error has occurred on receiving the packet, and
operating the base image forming apparatus to select, when the base image forming apparatus determines that the communication error has occurred on receiving the packet, one of the image forming apparatuses in the waiting state to be instructed to receive the packet sent from the host apparatus according to one of: an order of increasing distance between the one of the image forming apparatuses and the sub image forming apparatus that has requested the proxy response; and an order of increasing power consumption under the waiting state.

11. The non-transitory computer readable storage medium of claim 10, the proxy response method further comprising:
operating the base image forming apparatus to determine, on not receiving an acknowledgement packet from the host apparatus or not receiving data from the host apparatus after a connection has been established with the host apparatus, that the communication error has occurred.

\* \* \* \* \*